Nov. 13, 1951     C. E. SCHOU     2,574,986
TRANSFER TRANSMISSION MECHANISM
Filed Oct. 30, 1947     11 Sheets-Sheet 1
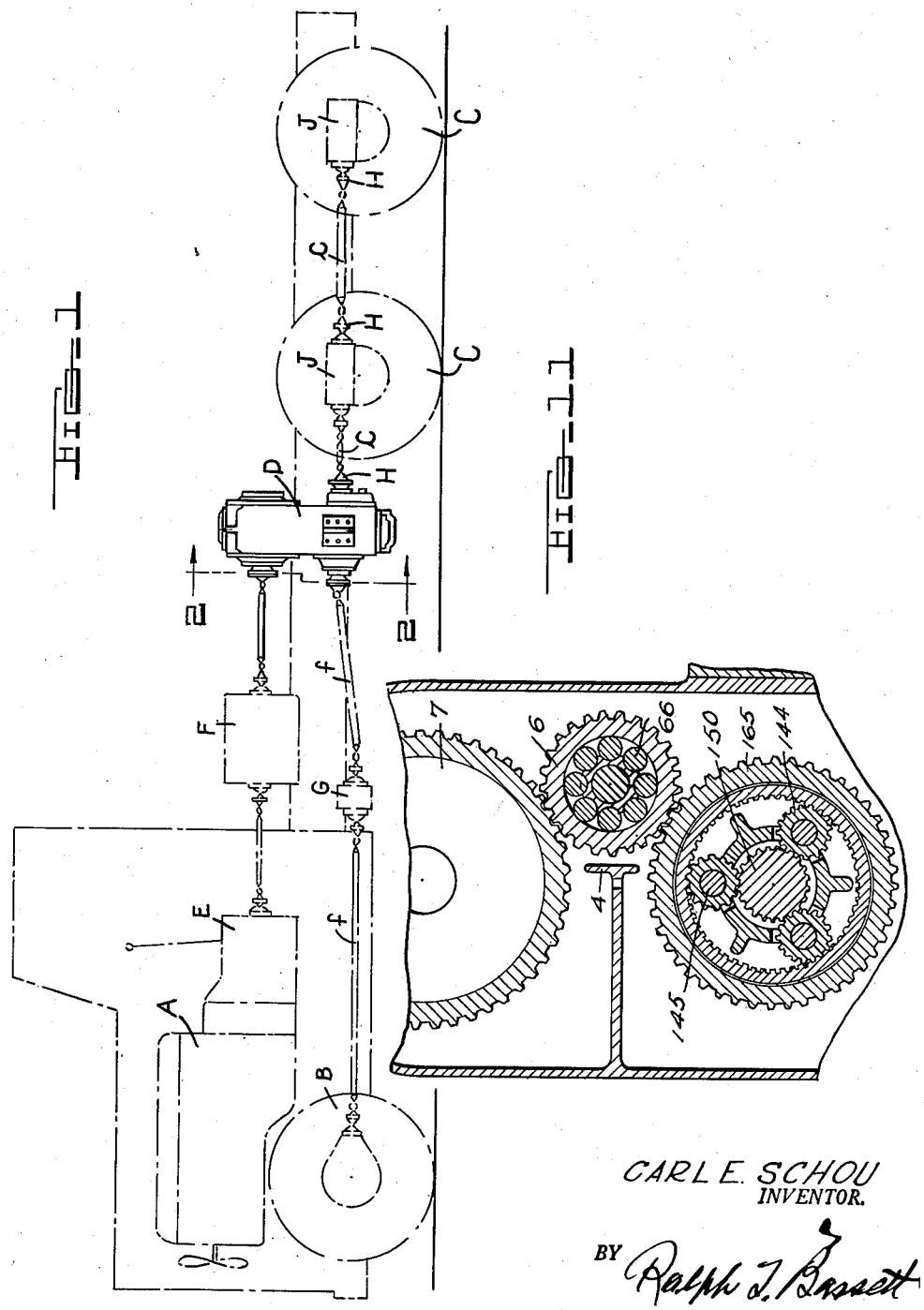
CARL E. SCHOU
INVENTOR.
BY *Ralph J. Bassett*
ATTORNEY Nov. 13, 1951  C. E. SCHOU  2,574,986
TRANSFER TRANSMISSION MECHANISM
Filed Oct. 30, 1947  11 Sheets-Sheet 2
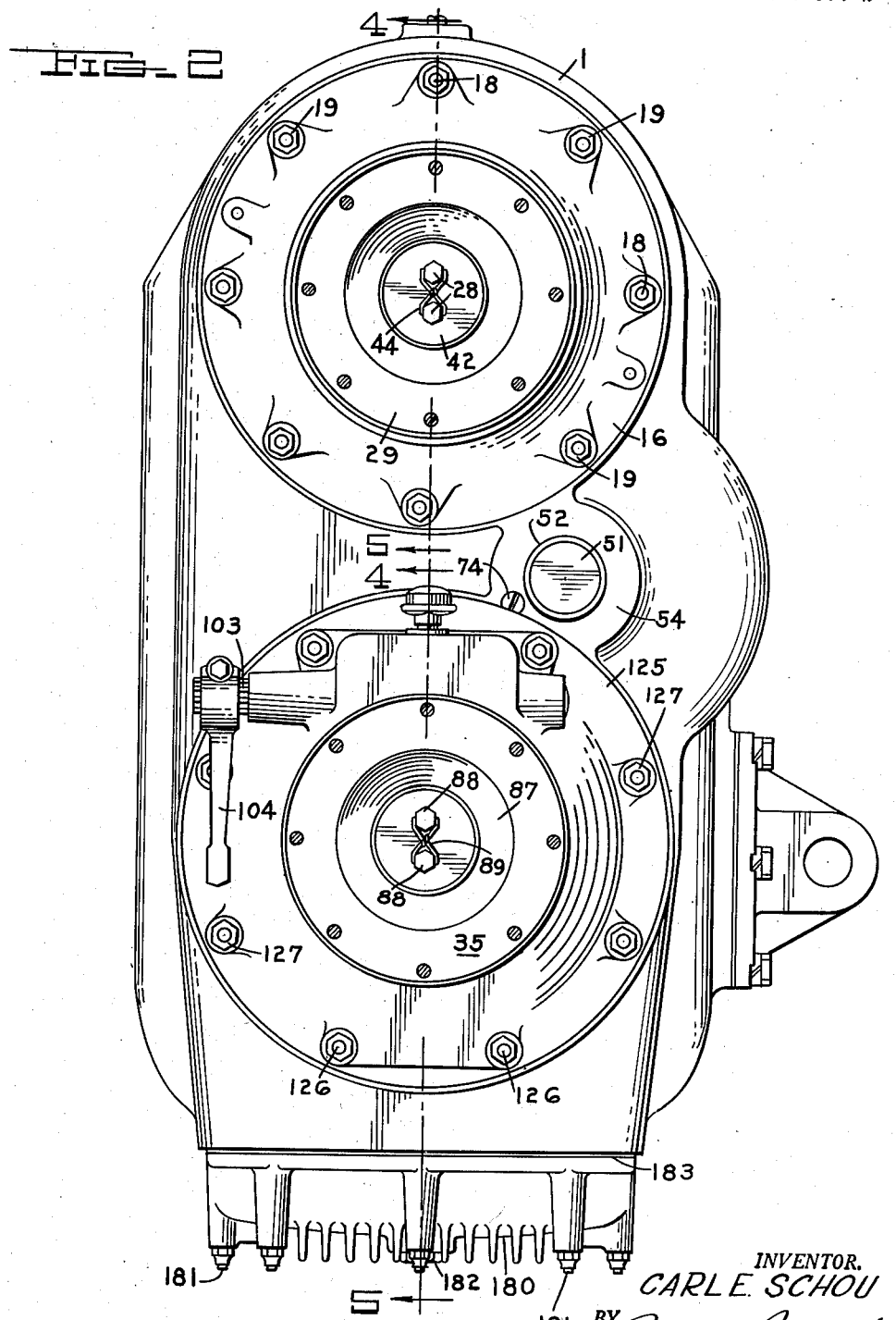
INVENTOR.
CARL E. SCHOU
BY Ralph D. Bassett
ATTORNEY

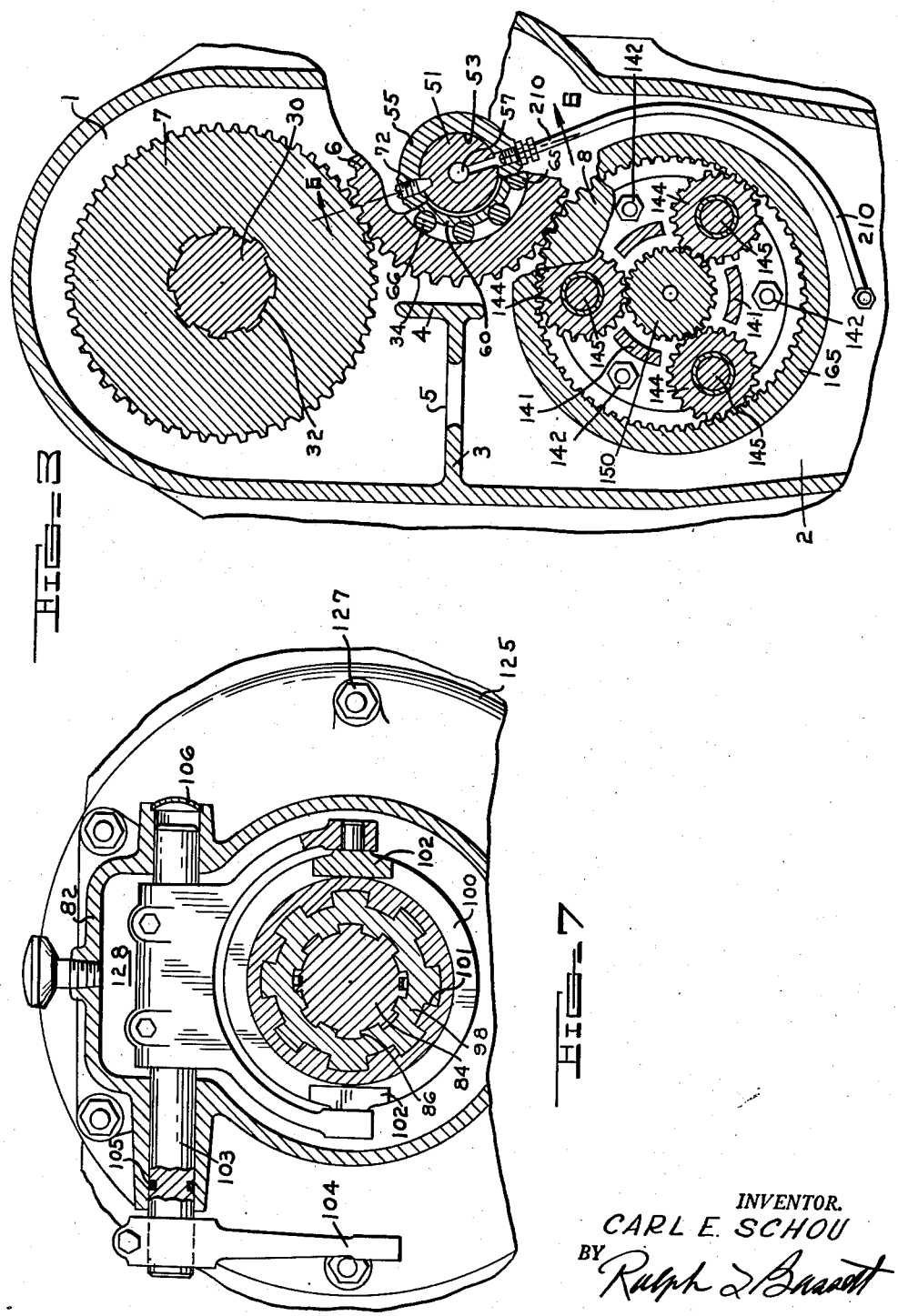

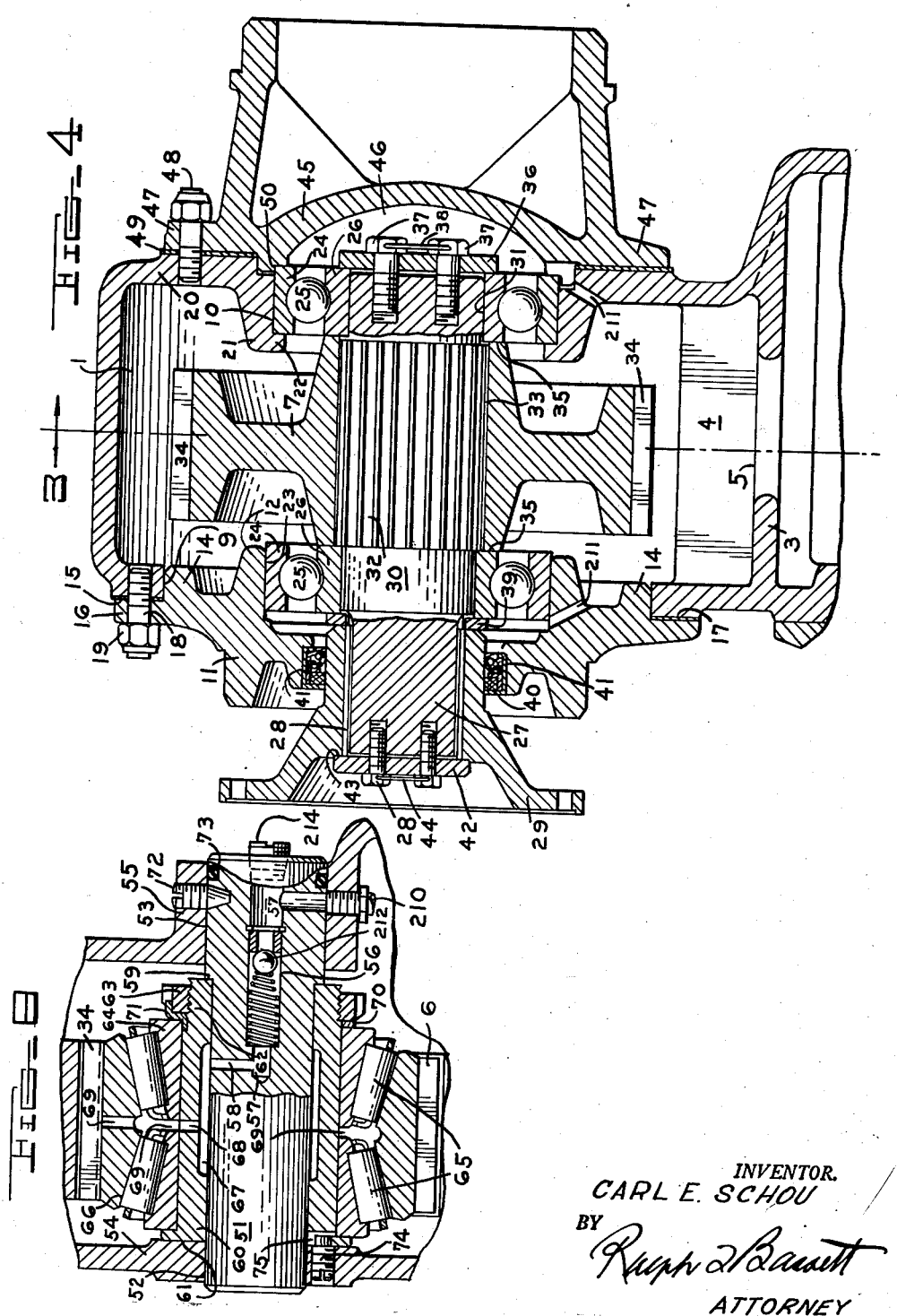

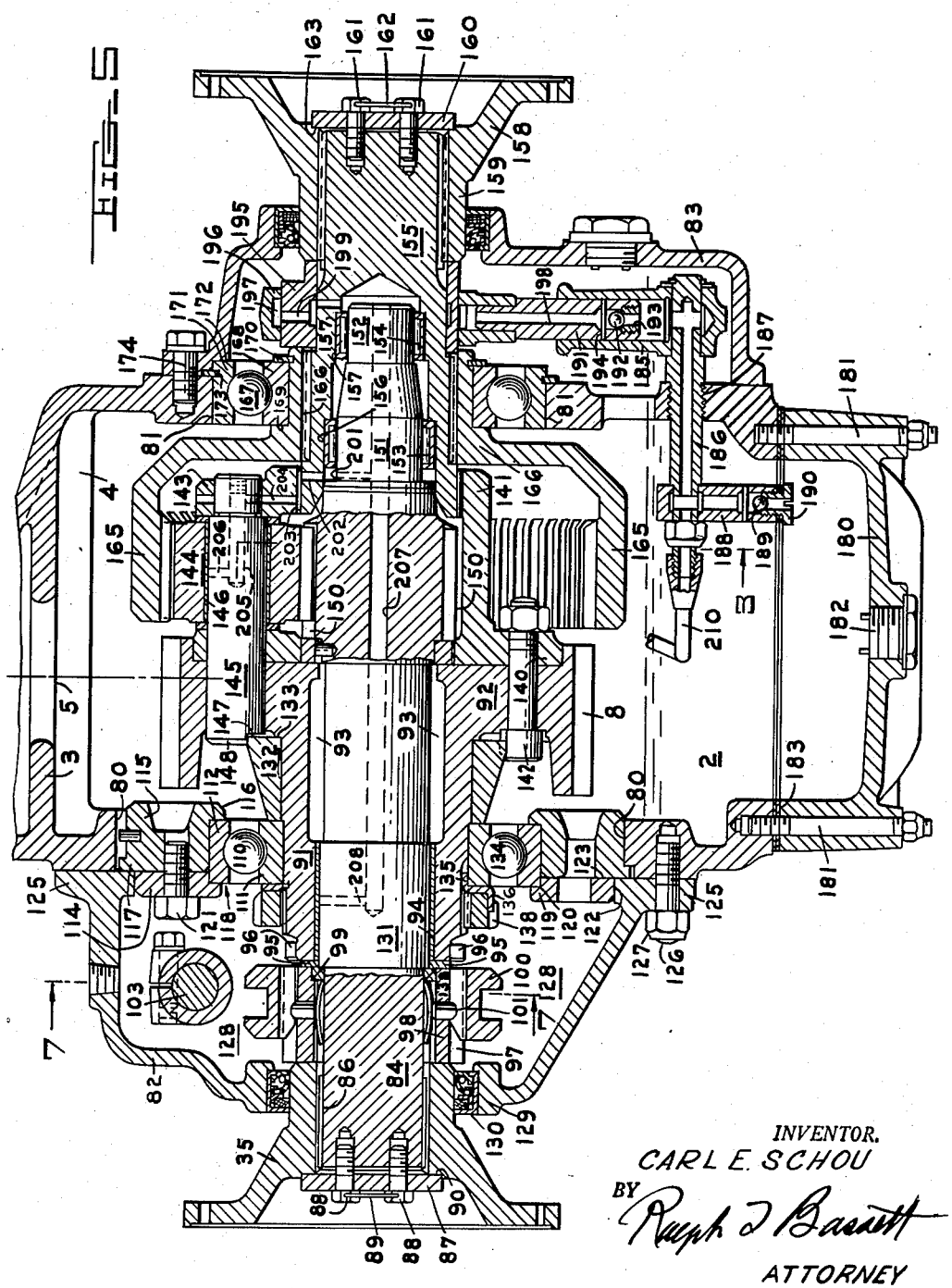

Nov. 13, 1951          C. E. SCHOU          2,574,986
TRANSFER TRANSMISSION MECHANISM
Filed Oct. 30, 1947          11 Sheets-Sheet 6
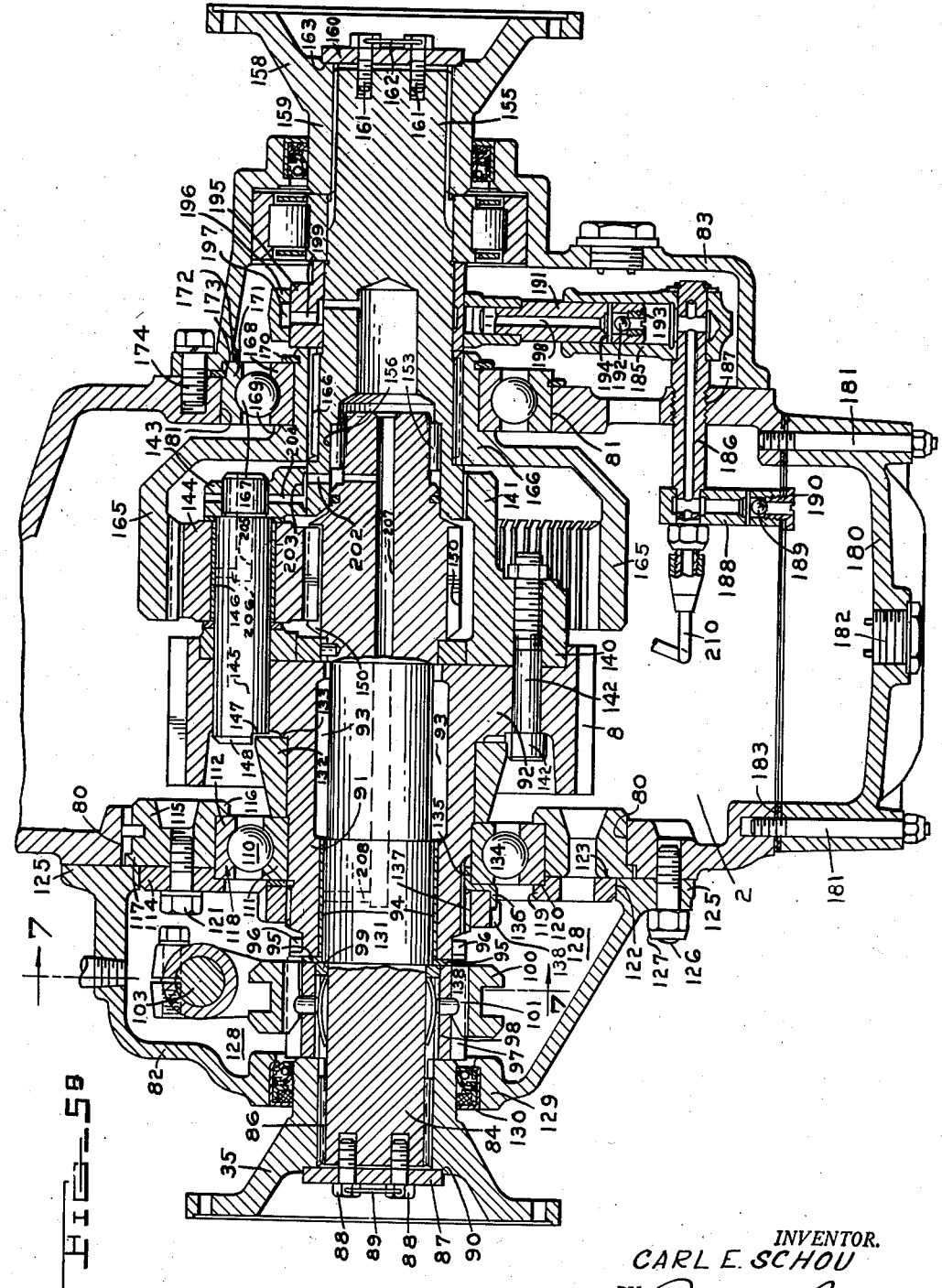
INVENTOR.
CARL E. SCHOU
BY
ATTORNEY

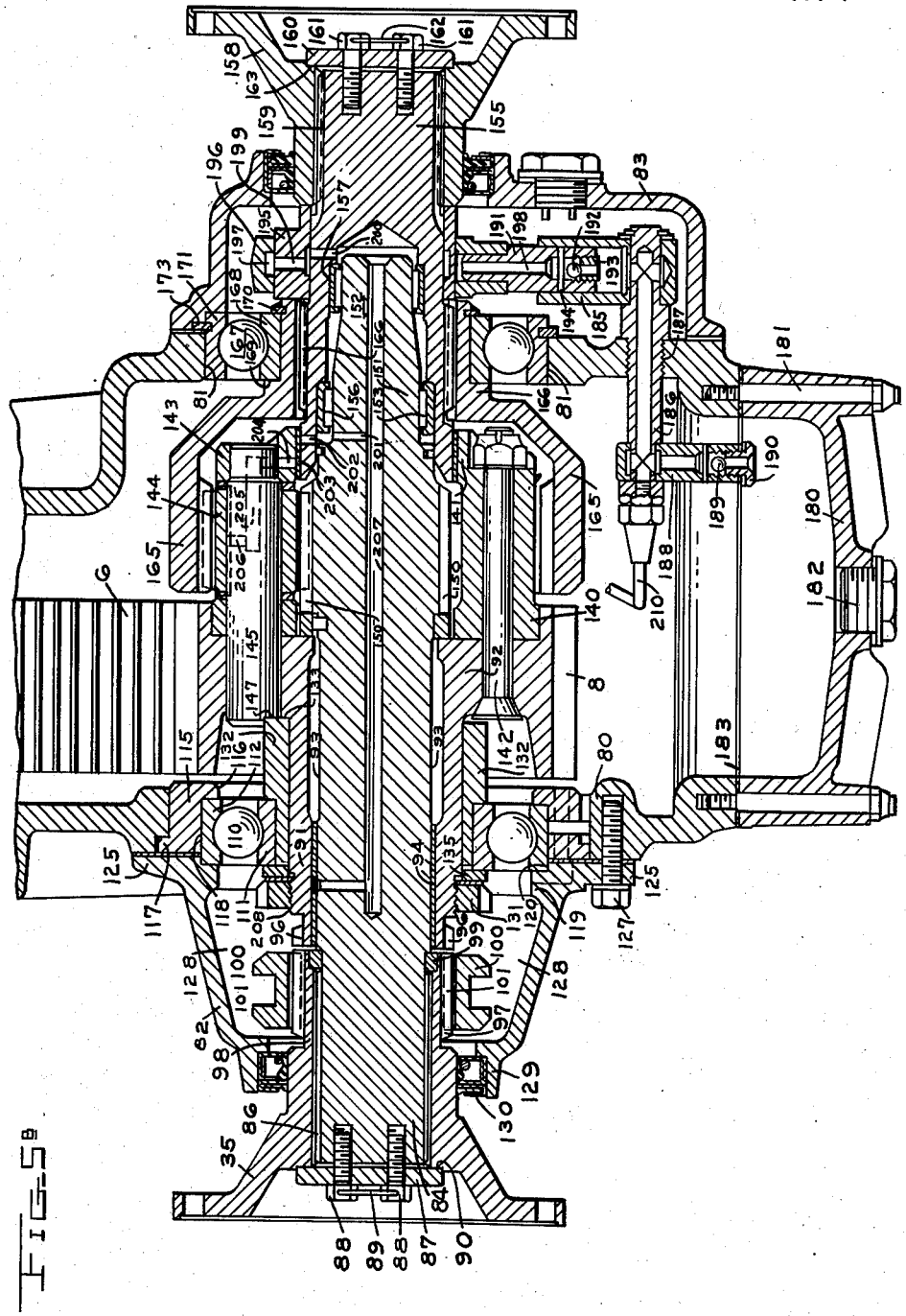

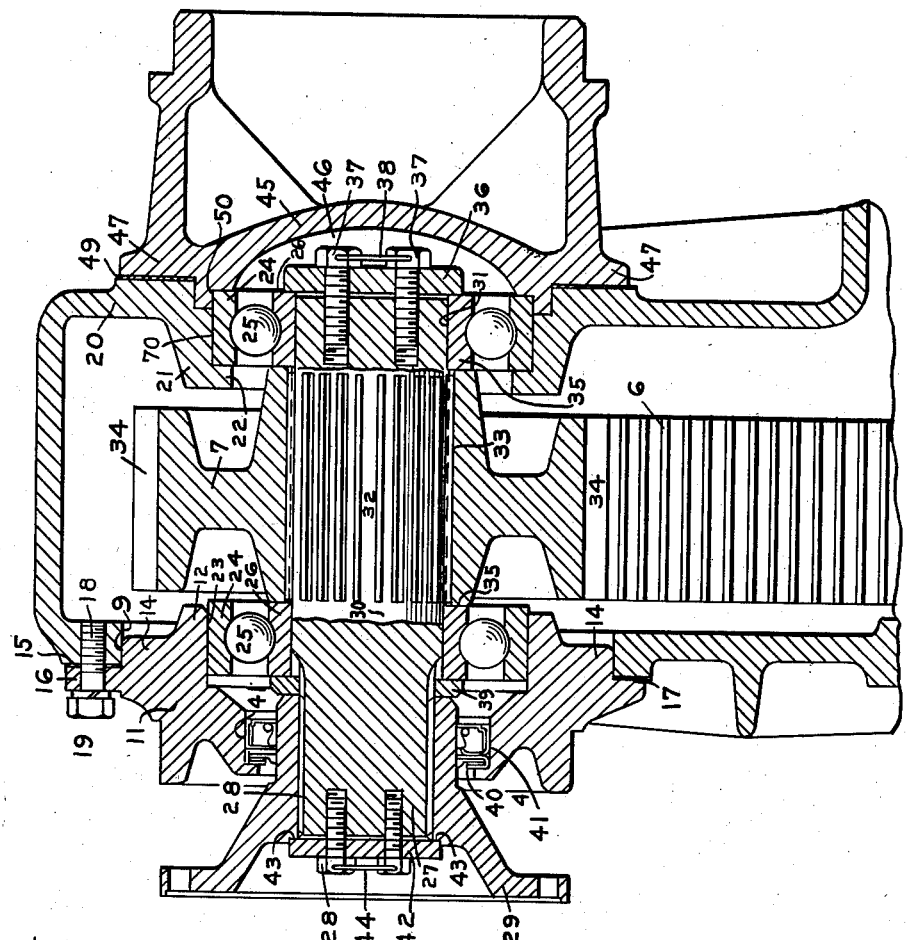

Nov. 13, 1951  C. E. SCHOU  2,574,986
TRANSFER TRANSMISSION MECHANISM
Filed Oct. 30, 1947  11 Sheets-Sheet 9
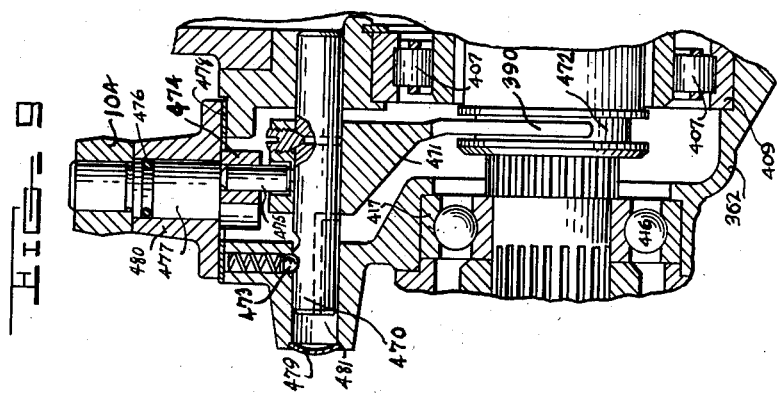
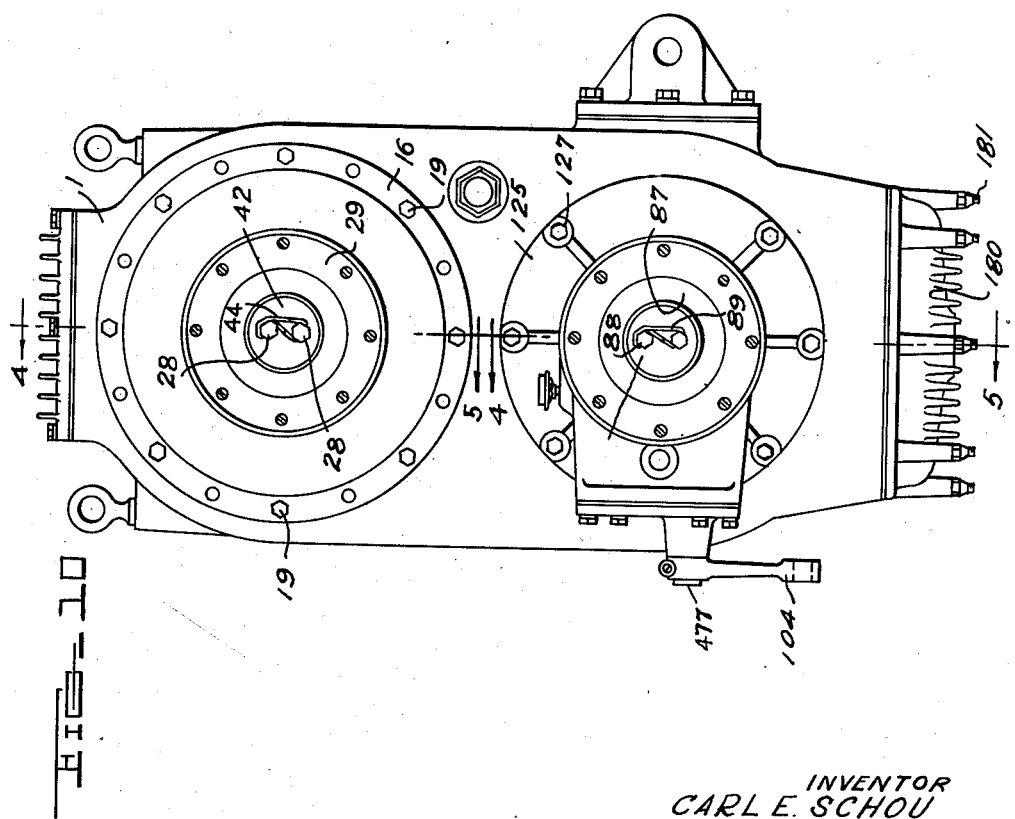
INVENTOR
CARL E. SCHOU
BY Ralph L. Bassett
ATTORNEY

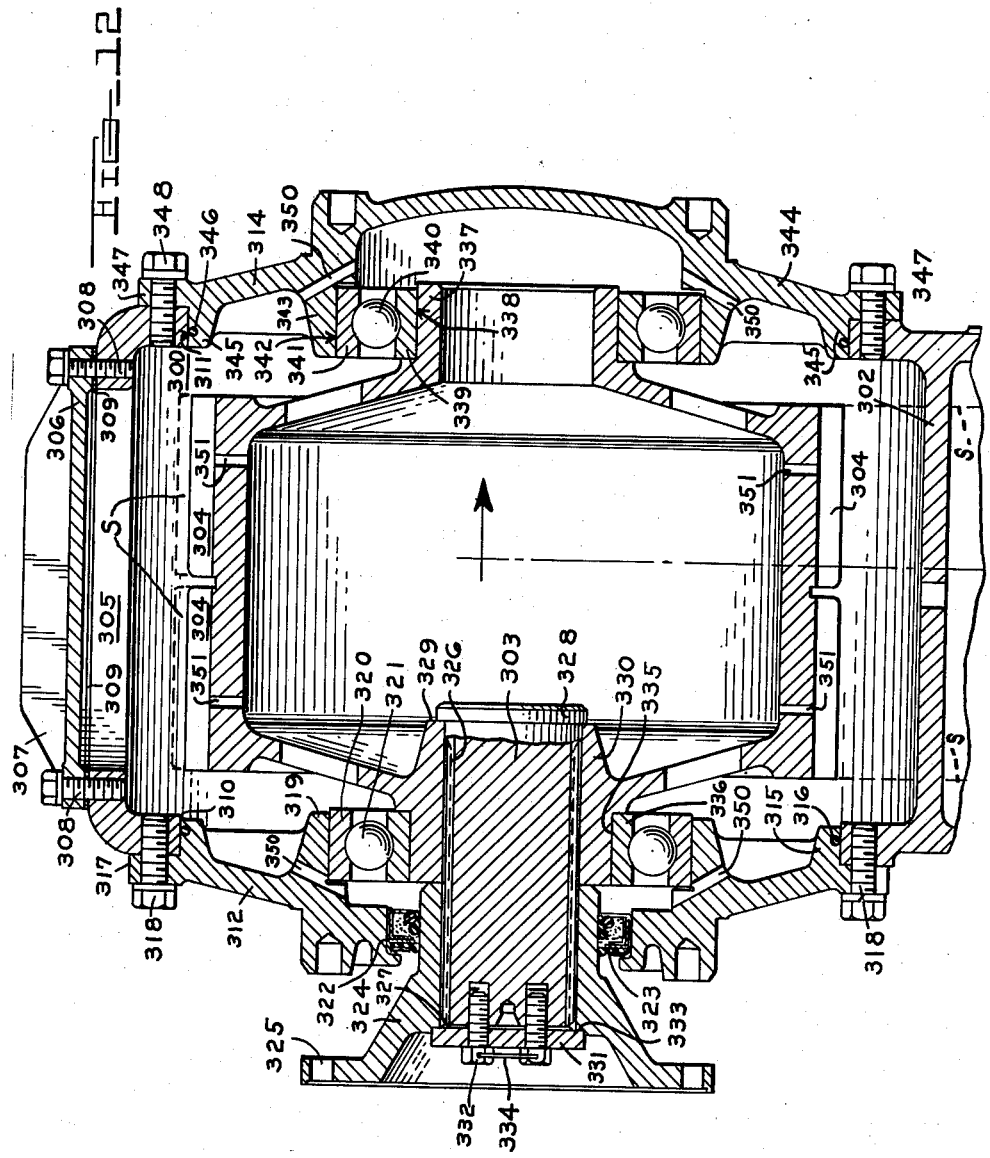

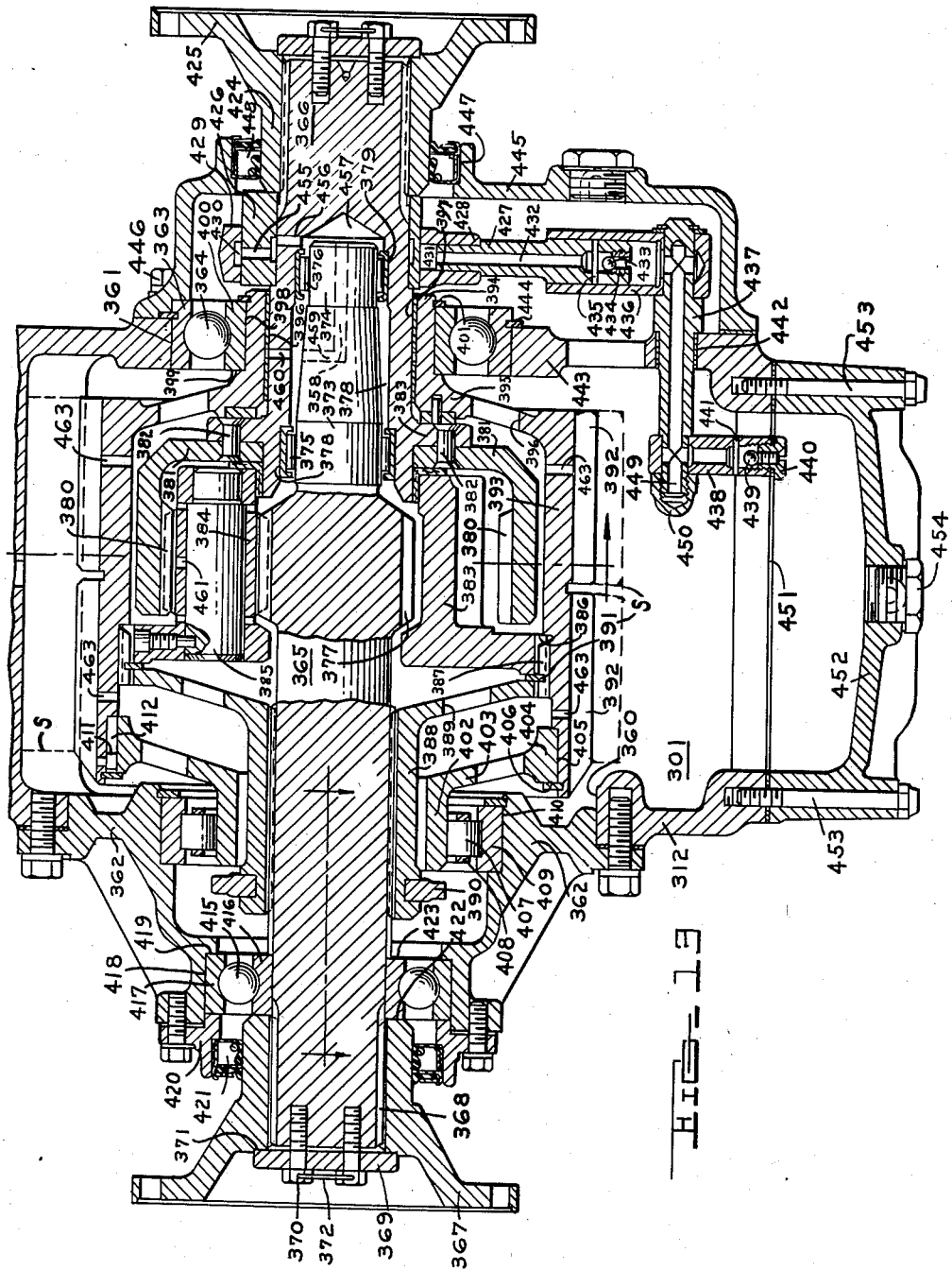
INVENTOR
CARL E. SCHOU
BY
ATTORNEY

Patented Nov. 13, 1951

2,574,986

UNITED STATES PATENT OFFICE 2,574,986

TRANSFER TRANSMISSION MECHANISM

Carl Einar Schou, Seattle, Wash., assignor to Pacific Car and Foundry Company, Renton, Wash.

Application October 30, 1947, Serial No. 783,169

2 Claims. (Cl. 74—714)

1

This invention relates to transfer transmissions for transmitting from a source of power to a plurality of driven members the proper equation of force.

More specifically, this invention relates to a structure of the general type indicated in which torque in an unequal amount can be transmitted from an engine to the front and rear axle of a motor vehicle or analogous structure, the torque being split to provide a proper, predetermined division of energy in accordance with requirements.

More specifically, the present design is shown applied to a motor truck in which a 25-75 ratio is provided, the gearing being so constructed and arranged that the front wheels will receive 25% of the power and the rear wheels 75% of the power.

Another primary object of the invention is the provision of a lubricating system for the power transmission which will not only supply ample and sufficient lubrication, but which, at the same time, creates a minimum of heat.

Other features of this invention will more clearly hereinafter appear by reference to the accompanying drawings and specification, wherein like characters of reference designate corresponding parts throughout the several views, in which:

Figure 1 is a side elevation of an outline of a motor vehicle in which the present invention is illustrated in the drive assembly, Figure 2 is a front elevation of the transfer mechanism showing the casing structure used in that type of gearing assembly of Figure 4 and Figure 5ᵃ, Figure 3 is a fragmentary vertical sectional view through the gear type transfer mechanism, Figure 4 is a vertical section through the upper part of the housing of the transfer mechanism showing an enlarged view of the input drive assembly, Figure 5 is a vertical section showing one form of the output assembly, the structure of Figure 5 being the lower portion of the view of Figure 4, Figure 5ᵃ is a similar view of a slightly modified type of output assembly for association with the same figure, Figure 5ᵇ is a further modification of the lower portion of the transfer mechanism including the output structure, Figure 6 is a vertical sectional view through the upper part of a transfer mechanism particu-

2 larly designed for association with the output structure of Figure 5ᵇ,

Figure 7 is a vertical sectional view taken on line 7—7 of Figure 5 and showing the clutch structure, Figure 8 is a sectional view through the idle gear interposed between the input and output gears of the gear type transfer mechanism, Figure 9 is a fragmentary sectional elevation of the clutch shifting mechanism, Figure 10 is a side elevation of that form of gear transfer mechanism illustrated in Figure 5ᵇ and Figure 6, Figure 11 is a fragmentary vertical sectional view showing the arrangement of the idling gears in Figure 5ᵇ and Figure 6, Figure 12 is a vertical sectional view through the input structure of the sprocket type transfer mechanism and, Figure 13 is a vertical sectional view of the lower portion of the sprocket type transmission illustrated in Figure 12.

The invention, for the purpose of illustration, is applied to a motor truck assembly in which the source of power is indicated by the reference character A, the front wheels B and the rear wheels C. A tandem rear wheel assembly is illustrated in this Fig. 1, however, it will be fully appreciated that the invention can be adapted to other types and forms of motor vehicles. The transfer mechanism which comprehends the basic invention to be hereinafter described is indicated by reference character D, and power is provided this transfer mechanism D from the engine A through unit transfer E and auxiliary transmission F. The power from the transfer mechanism D is supplied to the rear wheels C through the drive shafts c and c' and suitable universals H, with conventional gearing J supplying the power directly to the usual axles. Power for the front wheels B is furnished through shafts g, g' and universals G and H.

In the first form of the present invention the gear housing is shown by Fig. 2, this gear housing being at D in Fig. 1. The housing is preferably cast to provide upper chamber 1 and lower chamber 2 defined by the medially positioned partition 3 terminating in the marginal web 4 and having a central opening 5 as shown in Fig. 3. The transversely extending horizontal web 3 terminates substantially inward from the opposite wall of the casing to provide room in the housing for clearing the connecting idling gear 6 which meshes with the upper input gear 7 and the lower gear 8. The Figs. 4 and 5 show the gear assembly, Fig. 4 disclosing the upper part of the gear housing and the mechanism enclosed, and Fig. 5 showing the lower part of the same housing and the driven mechanism arranged therein.

With particular reference to Fig. 4 it will be noted that the upper portion of the casing D is provided with axially aligned openings 9 and 10, the opening 9 being relatively large and adapted to receive the supporting plate 11. The plate 11 includes an inwardly projecting annular flange 12, so formed as to extend inward of the inner face of the adjacent wall of the case D when the plate 11 is seated in the opening 9 heretofore mentioned. A snug fit is provided between the inner face of the opening 9 and the plate 11, this being provided by means of the peripheral face of the outer annular flange 14, the latter face being machined for snug engagement and for maximum sealing effect with its cooperating part. The sealing between the plate 11 and the adjacent wall 9 of the transfer casing is further perfected by use of the gasket 15 between the inner face of the radially projecting flange 16 and the outer flattened face 17 provided adjacent the opening 9 and at the outer face of the casing. Bolts 18 lock the plate 11 to the casing wall and suitable nuts 19 are associated with the bolts to maintain the parts in fixed relation. Any suitable number of bolts may be used as shown in Fig. 2 of the drawings. The plate 11 is provided with a central opening axially aligned with the opening 10 in the opposite wall of the casing. The outer wall of the casing 20 is formed with an inwardly projecting flange 21, this flange being formed with the annular seat 10 and the shoulder 22. The inner face 23 of the plate 11 and the annular opening 10 in the outer wall of the housing outer wall 20 of the housing D of the same diameter and aligned to receive the outer raceways 24 of the ball assemblies 25, the latter also including the inner raceways 26 which are mounted on the input shaft 27. The input shaft 27 has its outer end splined at 28 for connection with the coupler member 29. The splined end is of somewhat reduced diameter as compared to the balance of the input shaft, spaced portions of which at 30 and 31 are reduced and machined to seat the inner raceways 26. Intermediate the portions of the input shafts 30 and 31, upon which the raceways 26 are mounted, is the splined portion 32 for receiving the splined hub 33 of the gear 7 the latter having its teeth indicated at 34. The splined hub 33 has its end faces 35 snugly engaging the adjacent inner faces of the inner raceways 26 to prevent shifting of these raceways toward each other. The spreading of the raceways 26 is prevented at the outer end of the input shaft 27 by means of the keeper plate 36 which is secured to the end of the input shaft by spaced bolts 37, the latter being locked by means of a suitable bolt lock or seal indicated at 38. The keeper plate 36 is of greater diameter than the end of the output shaft 27 and the inner marginal face of this plate 36 overlies and abuts the outer face of the inner raceways 26 and at the same time positions and locks the input shaft as shown. The inner race 26 of the inner ball assembly is clamped against axial movement by means of a snap ring 39 interposed between the adjacent end of the coupling member 29 and said inner raceway. A packing ring or assembly 40 is provided between coupling section 29 and the inner face 41 of the opening of the plate 11. To prevent axial movement toward the power end of the coupling member 29 the keeper plate or flange 42 is provided, the latter being fixed to the inner end of the input shaft 27 by the bolts 28. The keeper plate 42 projects over and seats in an annular recess 43 in the inner face of the coupler member 29 and this assembly is locked and/or sealed by the sealing means 44. A closure plate 45 is used for sealing the opening 10 in the outer wall of the casing. This plate 45 is provided with a concave medial portion 46 to provide clearance for the keeper plate flange 36 and its connecting means. The plate 45 includes flanges 47 which overlie and are secured to the transfer case about the opening 10. Stud bolts 48 or other suitable fastening means clamp the plate 45 to the transfer case and a gasket 49 is arranged between these parts to effect a proper seal. The marginal edge of the concave portion 46 of the plate 45 is provided with an annular flange 50 which seats about and positions the outer raceway 24 of the outer bearing assembly.

The arrangement of the intermediate gear 6 for transmitting torque from the input shaft to the output shafts is shown in Fig. 3 in transfer section with an enlarged longitudinal view at Fig. 6, the view in Fig. 6 being illustrated of a size and so arranged as to be operably associated with Figs. 4 and 5. The mounting for the intermediate gear 6 includes a shaft 51 the ends of which are supported in the inner and outer walls of the casing. To provide for the support of the shaft 51 the casing at the proper position is formed with aligned openings 52 and 53 and adjacent these openings the walls are suitably thickened for reinforcement at 54 and 55. The reinforced wall portion 55 is relatively thick to provide for the feeding of lubricant, the arrangement of lock screws and packing. The shaft 51 is drilled axially from its outer end for substantially half its length as indicated by reference character 56 with the inner end of the bore reduced as at 57 and communicating with the laterally extending port 58. The shaft 51 is reduced throughout a greater portion of its length as defined by the annular shoulder 59, to provide for the seating of the bearing supporting bushing 60. This bushing 60 is formed with an annular laterally extending shoulder 61 and a threaded opposite extremity 62, the latter receiving the threaded lock ring 63 for positioning and retaining the adjacent end of the raceway 64, the opposite of which abuts against the flange 61 of bushing 60 as heretofore mentioned. Radial tapered roller bearings 65 are provided on the raceway 64, these bearings being of the tapered type with the raceway inwardly inclined for center thrust. Upon these bearings 65 is mounted the intermediate gear 6, the latter being provided with the tapered faces 66 which run on the bearings 65 to provide a free running gear for transmitting the torque from the input to the output shafts. It will be noted that the bearing support or bushing 60 is medially recessed at its inner face as shown at 67 to provide a lubricant reservoir with suitable radial outlet ports 68 for transmitting the lubricant through the ports 69 in the raceway for lubricating the roller bearings 66, and for further lubricating the meshing faces of the gear teeth 34 by means of the port 69. The port arrangement at both 68 and 69 will be such as to provide maximum lubrication at these vital parts. A lock ring 70 has projection 71 which engages in recesses in the lock ring 63 and the bushing 60 to prevent relative rotation of the associated parts. A screw plug 72 is threaded through the hub 55 to engage the shaft 51 to prevent axial movement of this shaft. Sealing of the shaft at this end is provided by the O-ring gasket 73 arranged in an annular recess adjacent the end of shaft 51. At the opposite or inner end of the shaft 51 a screw or pin 74 extends through the casing wall to a slot 75 in the end of the bushing 60 to prevent relative rotation of these parts and to maintain these parts in proper association.

As previously stated, the purpose of the present mechanism is to distribute power from the input to both the front and rear axles, providing a gear ratio which will apply to each axle torque in accordance with the predetermined design. Referring particularly to Fig. 5 it will be seen that the gear supporting structure approximates generally the arrangement for the input gear in that sealing plates are provided which are fixed to and form a part of the housing, these plates partly carrying the bearing structure for the shafts. In the lower compartment 8 the casing has its front and rear walls formed with openings 80 and 81 respectively, and covering these openings are the plates 82 and 83. The drive to the front axle is through shaft 84, the front end of which is shown as having the coupling element 85 secured thereto by the use of the meshing splines 86 on the coupling member and on the end of shaft 84. A keeper flange on plate 87 is bolted to the end of shaft 84 by stud bolts 88 fixed by lock seals 89, and overlies the coupling element 85 and seats in the annular recess 90 formed therein. This arrangement prevents the axial movement of the coupling element forwardly. The gear 8 is formed with a substantial forwardly extending hub 91 with an intermediate web portion 92, connecting the gear ring and hub and supporting a unit of the planetary, through which torque is furnished the output shaft providing power for the rear axle. The bore of the hub 91 is enlarged at its outer or rear end to form the annular chamber 93 about the shaft 84, the bearing face for the hub 91 to mount the same on the shaft 84 being primarily at the inner or front end where the plain bearing 94 is provided. This plain bearing 94 extends between the forward end of the chamber 93 and the front end of the hub 91, where thrust washer 95 provides a thrust element. A toothed clutch face 96 is formed at the inner end of the hub 91, and the teeth of this clutch face are aligned with the teeth 97 of clutch element 98, the latter being interposed between the adjacent end of the flexible joint element 35 and the hub, and is splined to the end of shaft 84 by having the teeth of its bore engaging the splines 86 of shaft 84. Thus, the splines on the inner end of the shaft 84 accommodate both the coupling element 35 and the clutch 98. A segment ring 99 is interposed between the outer end of the clutch element 98 and the thrust washer 95, being seated in an annular recess in the end of the clutch ring 98 and abutting against the thrust ring so that these and associated parts are retained in their respective positions.

The sliding clutch collar 100 has its teeth 101 intermeshing with teeth 97 of clutch ring 98 and is shiftable to engage the teeth 96 on the adjacent end of hub 91. A conventional shifting fork 102 is illustrated at Fig. 7 including the pivotal pin mounting 103 and operating arm 104. Inasmuch as pressure lubricant is essential an O-ring is used at 105 to seal one end of the pivot pin 103, while at the other end the fork is provided with the expansion seal cap 106 which seals this possible outlet.

The hub 91 rotates on the bearing sleeve 94 mounted on the shaft 84 and this hub and shaft assembly and related parts are supported within the ball bearing 110, this ball bearing including the inner raceway 111 mounted on the hub 91 and the outer raceway 112 carried by the ring support formed of ring sections 114 and 115. The ring support section 115 seats snugly in the opening 80 formed in the lower portion 8 of the crank case and includes inner marginal flange 116 and outer marginal flange 117. The flange 116 engages against the adjacent side face of the outer raceway 112, while the peripheral face of this raceway seats against the inner face of ring section 115 as shown at 118. The ring section 114 of the bearing support is formed with flange 119 at its inner edge, this flange engaging the inner side face of the outer bearing raceway 112 and overlying the peripheral raceway for a portion of its structure as at 120, to form in conjunction with the supporting section 112 a channelled annular support for the bearing structure. Bolts suitably arranged and of any number are identified by reference character 121 and clamp the supporting ring structure 114 and 115 together and about the outer raceway 112. The annular supporting section 114 has its outer peripheral face seating snugly in the wall of the opening 122 of closure plate 82. It will be noted that the opening 122 in the hallow plate structure 82 is of less diameter than the opening 80 in the wall of the main casting. This structure enables a substantial part of the inner face 123 of the ring support section 115 to abut against the adjacent face of the plate 82 which overlies the opening 80. The wall of the opening 80 is recessed about its inner marginal edge to provide an annular socket for receiving the flange 117 of ring section 115. Thus, the flange 117 is clamped between the adjacent faces of the main casting and the flange 125 of the cover plate. Stud bolts 126 clamp these parts together in association with the conventional nuts 127. The cover plate 82 is concave to provide a substantial chamber 128 which incloses a portion of the hub 91, the clutch parts 97 and 98 and other associated parts such as the clutch control means. The end flange 129 of the plate 82 is shaped to receive a suitable bearing and seal ring structure 130 within which the outer portion of the coupling member 35 is received and supported. A thrust ring 134 is splined onto the gear hub 91 and urges the inner raceway 111 against the face of the filler ring 132, the latter snugly seating on the hub against an annular shoulder 133. A lock washer is interposed between the thrust ring 134 and the inner raceway 111 and this lock washer is provided with tongues 135 and 136. Tongue 135 is bent into a slot 137 formed in the hub while tongue 136 is seated in slot 138 in the thrust ring 134.

The spur gear 8 which is driven through intermediate idle gear 6 from gear 7 splined on the input shaft 27 has fixed to its outer hub and web structure the planetary pinion carrier or cage including the flange 140 and ring structure 141. The flange 140 is bolted by bolt 142 to the hub 92 of spur gear 8, while the ring portion 141 carries at its outer face the pinion shaft end supporting structure 143. The pinions 144 are each mounted on its shaft 145 by a bearing 146. The arrangement of the pinions is shown in Fig. 3. The pinion shafts 145 extend through the pinion carrier cage flange 140, end support structure 143, and also through the hub 92 of the spur gear 8, so that these pinions, properly spaced for planetary movement are carried by and rotate with the gear 8. The inner ends of each of the shafts 145 is cut back at 147 to permit the upper portion of the pin 148 to overlie the adjacent face of the filler ring 132 and to be locked against rotation thereby.

The shaft 84 beyond the hub structure 91 of the gear 8 is formed with a toothed surface providing a gear structure 150, this gear structure being located outward from the hub portion 140 of the pinion carrier in a position to normally mesh with the pinions 144 of the planet pinion assembly. Thus, the gear 150 forms the sun gear of a planetary structure. The shaft 84 outward of the sun gear 150 is provided with bearing surfaces 151 and 152 for receiving the roller bearings 153 and 154 respectively. The end bearing portion 152 is substantially reduced in diameter with respect to the bearing portion 151 and both of these bearing portions 151 and 152 and their bearings are received within the hollow concentric rear output shaft 155. This shaft 155 is formed with a stepped axial bore to provide the bearing surfaces 156 and 157 which cooperate with the rollers 153 and 154 respectively. The outer end of the shaft 155 is solid, and splined at its peripheral surface to receive the splined inner wall of the coupling member 158 as shown at 159. Outward movement of the coupling member 158 is prevented by the keeper flange or plate 160, the latter being bolted to the end of the shaft 155 by the bolts 161 which are locked with the sealing wire 162. The keeper plate 160 has its marginal inner face overlying and seating within a groove 163.

A ring gear 165 has its hub portion 166 splined to the shaft 155, which portion of the shaft 155 is directly supported by the bearing assemblies 153 and 154. The ring gear 165, the planet pinions 144 and the gear 150 complete a planetary assembly. A roller bearing assembly 167 is arranged between the hub 166 of the ring gear 165 and the adjacent casing wall and cap structure 81—83. The inner ring 168 of this bearing assembly is snugly seated on the hub 166 against the hub shoulder 169 and a snap ring 170 locks this raceway 168 against displacement. The outer raceway 171 seats against a shoulder 172 formed in the cap structure 83 and a snap ring 173 fixed in a groove in the outer peripheral face of this raceway is clamped between the cap 83 and the adjacent casing wall by the bolts 174.

At the base of the casing, a plate 180 is provided with a concave face forming an oil pan or sump which is bolted to the lower open casing by bolts 181. The usual magnetic drain plug 182 is provided in the pan at the lowest point of the wall to permit effective draining and the usual gaskets 183 permit sealing of the structure.

The present structure necessarily involves a difficult lubricating problem and to effectively provide essential lubrication to the moving parts, an oil pump 185 is provided. The pump 185 is supported by the hallow tubing 186 threaded at 187 in the vertical wall of the casing. The inner end of the tube 186 is provided with the downwardly extending inlet 188 having inlet ball valve 189 and removable threaded seat 190. The oil pump piston 191 is hallow and has at its lower end the inlet valve 192, and a removable adjustable valve seat 193. A stop pin 194 limits the movement of the valve 192 from its seat 193. An eccentric ring 195 mounted on the shaft 155 actuates the pump by means of the annular strap 196, the latter being formed with an annular recess 197 which is in open communication with the passageway 198 in the pump piston. The lubricant is forced through passageway 198 and channel 197 into and through a port 199 in the eccentric 195. The port 199 communicates through port 200 in shaft 155 with the inner end of the bore in this shaft. The lubricant being under pressure flows across the bearings 153 and 154, and associated parts, and follows the curved face 201 of the shaft through port 202 in shaft 155 into an annular recess 203 which communicates with radial ports 204 opening into oil feed passageways 205 in the pinion shafts 145 to lubricate through the bypasses 206 the plain bearings 146 about which the pinions 144 rotate. A portion of the lubricant flowing through port 200 into the hallow shaft 155 is discharged through axial passage 207 in shaft 84, this passage 207 terminating in a bypass 208 at its inner end, to supply lubricant to the bearing 94 upon which is mounted the hub 91 of the spur gear 8. The escaping oil from bearings 94 and 146 is discharged over adjacent moving parts, fully lubricating each of them.

The intermediate idle gear receives oil from pipe 210 connected with the end of inlet pipe 186—188 and conveys the lubricant to the intermediate idle gear 6 through the axial oil passage 57 in gear shaft 51. This shaft drilled from one end inward, as previously described to permit lubricant to flow through passages 58, 67, 68 and 69 to lubricate the bearing surfaces and the gear surfaces, the oil from the intermeshing gears 6 and 7 being conveyed to the latter gear and discharged laterally to complete the lubrication of the input gear assembly and its bearings 25. Surplus oil from the input assembly is discharged through ports 211 downwardly through the casing to the sump, where the pump recirculates in accordance with desired pressures. To obtain proper oil pressure, a ball valve 212 is provided in the shaft 51, this ball seating against the flow of lubricant onto a seat 213.

In the form of the invention just described the input shafts and the output shafts are connected by an intermediate idling gear of the type shown in Figure 6. The output shafts shown are of modified form as disclosed by Figures 5, 5ª and 5ᵇ, the variation in structure being basically for the purpose of increasing the stability of the structure under varying conditions.

The primary difference between the disclosures of 5, 5ª, and 5ᵇ consists in shortening the forward or inner concentric output shaft 131 which provides an enlarged lubricant chamber L which is supplied with lubricant through passageway 199 from the pump 185. Also in the modification 5ª the housing section 83 is provided with a roller bearing assembly R at the outer end of this housing section, which latter is extended to provide a seat r for the raceway V. This arrangement increases the supporting points for the rearwardly extending output shaft 155, which in the other modifications 5 and 5ª was supported by the roller bearing 167. By this arrangement the stability of the structure and possible distortion and misalignment of the output shafts due to torque variables is substantially eliminated. Also the lubricating system is provided with increased reservoir capacity within the shaft 155.

A further modification of the idea is illustrated in Figures 11, 12 and 13, these figures embodying a structure in which a sprocket drive is provided in lieu of the idling gear of the modified forms of Figures 5, 5a and 5b. The use of the sprocket essentially requires a modification of both the input and output shaft assemblies this being particularly true as a dual sprocket is utilized.

The description now relates to the sprocket type of assembly of Figures 11, 12 and 13.

The present development relating to transfer mechanisms utilizes a casing which provides an upper chamber 300 and a lower chamber 301 defined by a central strut or brace 302. The upper chamber structure of the casing which accommodates the input shaft 303 and the dual input sprocket gears 304 is provided with a top opening 305 normally closed by the plate 306, the latter being provided with cooling fins 307 and being secured in place by bolts 308. A sealing gasket 309 is used to prevent leakage of the oil from within the casing which will be subject to substantial vaporization due to the spraying action of the moving parts. Axially aligned openings 310 and 311 are provided in the front and rear walls respectively, these openings receiving the supporting plates 312 and 314, which plates close the openings and form the supporting structure for such parts as the gears and input shaft.

The front plate 312 is provided with the inwardly projecting annular flange 315 which fits snugly in the opening 310 in the front wall of the upper chamber 300 and the joint between the flange and the adjacent wall defining the opening is sealed by an O-ring 316. The marginal edge portion 317 of the plate 312 overlies the adjacent outer face of the casing wall about the opening, and receives the bolts 318 which seal these parts together. The front plate 312 is formed with an inner annular flange 319 which receives the outer raceway 320 of the ball assembly 321. Outwardly of the inner flange 319 the plate 312 is formed within the wall forming a central opening an annular seat 322 for receiving the sealing assembly 323 which fits about the hub of the coupling flange 324. The coupling flange 324 connects directly with the power shaft, being secured with the cooperating coupling elements by means of bolts or similar fastening means which extend through the opening 325 at the marginal edge of a flange structure. The input shaft 303 is splined substantially throughout its length as at 326, to its outer end 327, there being a head portion 328 at the opposite end in the form of a flange the face of which abuts the end 329 of the front hub 330 of the dual sprocket gears 304.

A keeper plate 331 is fastened to the outer end of the splined shaft 303 by bolts 332, the keeper plate overlying and seating in an annular recess 333 formed in the coupler flange 324 heretofore mentioned. It will be noted that the keeper plate 331, which is of disc form, by overlying and seating in the annular recess 333 forms a clamp for positioning the flange 328 against the face 329 of the hub 330. The tolerances permitted can be provided by adjustment of the bolts 332 and these bolts will be locked by the safety wire or seal 334 in the usual manner.

The front hub 330 of the dual sprocket 304 is provided with an annular seat 335 which receives the inner raceway 336 of the ball assembly 321. Thus the outer hub 330 is centered and retained during operation on the bearing 321 for its proper operation.

A rear hub 337 is provided for the opposite end of the dual sprocket casting and the outer surface of this hub 337 is formed with an annular seat 338 for receiving the inner raceway 339 of the bearing assembly 340. The outer raceway 341 of this bearing assembly 340 is seated in the annular recess 342 formed in the inner flange 343 of the inner supporting plate 344.

The supporting plate structure 344 snugly seats in the opening 311 formed in the rear wall 314 of the upper chamber of the casing, a flange 345 being provided for engagement with the wall defining the opening and an O-ring 346 provides a seal at this place. The peripheral edge 347 of the plate 344 overlies the outer marginal face of the casing about the opening 311 and bolts 348 of any number and arrangement are used for securing the plate in position. A plurality of oil ports 350 are provided to permit the flow of oil to the inside of the bearing assembly 321 and 340, these oil ports being arranged in sufficient number and at suitable points in the structure to provide proper and ample flow of the lubricant.

The dual sprocket 304 and the hubs 330 and 337 are cast as an integral hollow structure and oil parts 351 are formed in the casting and extend through the drum about which the sprocket teeth are formed. The ports 351 extend through the drum intermediate the teeth so that the flow of oil will be unretarded and complete lubrication of the associated parts and of the sprockets S, indicated in dotted lines, will be amply lubricated.

The front wall 312 of the lower chamber of the housing 301 is formed with an annular opening 360 while the rear wall is formed with the annular opening 361, the former opening receiving the lower front supporting plate 362 while the latter opening 361 receives the outer raceway 363 of the bearing assembly 364.

This lower casing 301 of the housing structure contains the concentric input shafts 365 and 366, the shaft 365 having the coupling member 367 splined at its outer end at 368 for connection with the front driven structure, which in a motor vehicle would be the front driven wheels. A keeper plate 369 is bolted by bolts 370 to the end of shaft 365 and overlies and seats within the annular groove or seat 371 in the coupling element 367. A safety wire or lock wire 372 is used to seal or lock the bolts in their adjusted position.

The shaft 365 is formed at its inner end portion with spaced bearing surfaces 373 and 374 about which are arranged the needle bearings 375 and 376 respectively. The end portion of shaft 365 forming the needle bearing surface 373 is of reduced diameter with the bearing surface 373 formed adjacent to the sun gear 377. The inner raceway 374 is at the extremity of the shaft 365 and is of less diameter than the bearing surface 373, thus forming a spindle structure for centering this shaft extremity within the hollow portion 378 of shaft 366. The arrangement of the reduced spindle-like structure of shaft 365 within and concentric to the hollow portion 378 of shaft 366 permits the arrangement of the raceways 378 and 379 in annular seats in this hollow shaft structure which inherently will work to prevent misalignment and distortion of the shaft 365 when under load. A ring gear 380 is fixed by means of the annular flange 381 and rivets 382 to the flange 383 of the outer or rear shaft structure 366 and rotates with this shaft.

A planet assembly is supported by the carrier or spider 383, this planet assembly including the pinions 384 which are conventionally three in number and are mounted for rotation on the pinion shafts 385.

The outer or front end of the driven shaft 365 is mounted in bearing assembly 415 by the use of an inner raceway 416 arranged on the shaft 365 and the outer raceway 417 seated in the annular groove 418 formed within the outer end portion of the supporting plate 362. A shoulder 419 limits the movement of the outer race in one direction, while the annular plate 420 confines the raceway 417 against movement in the other direction. A packing assembly 421 is provided between the end plate 420 and the hub of the coupler plate 367. The inner end 422 of the coupler plate hub 367 abuts the inner raceway 416 to limit the movement of the inner race 416 in the forward direction, while rearward movement is prevented by a shoulder 423 formed on the periphery of the shaft 365.

At an intermediate point along the outer surface of the shaft 366 between the hub 424 of the coupling member 425 and the hub 394 of the sprocket gear drum is arranged an eccentric strap 426, this eccentric 426 being the operating element for actuating the reciprocating piston 427 of the lubricant pump. The reciprocating piston 427 has its upper end secured to the hollow stud 428 of the ring 429 which is located about the eccentric 426 and is actuated thereby. The ring 429 is formed with an inner annular lubricant passageway 430 which communicates through the port or chamber 431 with the passageway 432 formed in the piston 427. The lower end of the piston is provided with an intake valve 433 operating against the valve seat 434 and limited in its off position by a cross pin 435. The piston 427 reciprocates in the cylinder 436 the latter being secured and supported at its lower end by the supporting pipe 437 having a downwardly extending intake 438 provided with the inlet valve 439, valve seat 440 and valve stop pin 441. The intake support pipe 437 extends through an opening 442 in the casing partition 443, this partition being a continuation of the casing wall and forming the support for the bearing 364 as heretofore described. It will be noted that a snap ring 444 is seated in the outer face of the outer raceway 363 and is positioned to be clamped at its upper edge by the end plate 445, whereby the outer race is prevented from moving in either direction. The plate 445 is secured by means of bolts 446 about the opening 361, this plate being concave to provide room for the pump assembly. A shaft opening 447 is provided in the plate in axial alignment with the opening 361 in the casing and between the opening 447 and the hub 424 of the coupling member 425 is the packing assembly 448 which seals the structure against loss of lubricant. Referring again to the lubricant pump structure it will be noted that supporting pipe 437 is open at its inner end 449 and a cap 450 closes this open end. Obviously a lubricant connecting pipe can be substituted for the cap 450 to carry the lubricant to any part which is not properly lubricated by the present disclosure.

The casing has an open lower portion indicated by reference character 451 and a sump plate 452 is bolted by means of bolts 453 over the opening 451 to provide for the accumulation of oil supplied from the pump to the structure. A magnetic plug for the separation of metallic particles is shown at 454, the use of this plug being well known in the art.

Lubricant from the sump is drawn by the pump assembly through check valve 439, support pipe 437 and hollow piston 427 and is discharged into the annular chamber 430 through port 431 and into and through the port 455 in the pump cam 426. From port 425 the lubricant is discharged through a passageway 456 into a chamber 457 formed by the spacing of the inner end portion of shaft 365 from the end wall of the hollow shaft 366. The lubricant being under pressure flows from the chamber 457 through passageway 458 lateral port 459 to the bearings 375 and 376. Part of the lubricant supply enters the oil passageway 460 in the hub of the ring gear assembly 381 providing lubricant for the bearing surface 393. The discharge of lubricant across the needle bearing 375 escapes to the sun gear 384 of the planet assembly. One or more ports 461 is provided in each of the planet pinions 384 to lubricate the bearings of these pinions. The teeth of the ring gear 380 are lubricated from the pinion. Surplus lubricant is discharged within the hub assembly and escapes through the series of lubricant ports 463, and in so escaping through these ports floods the sprocket chain S and is carried by the sprocket chain to the upper dual sprockets 304. All of the bearings are subject to a flow of lubricant from the sprocket chains which provides a splash system for all moving parts. Suitable passageways such as 350 in the upper chamber structure provide for the escape of the lubricant back to the sump.

The spider or carrier assembly 383 is formed at its annular peripheral face 386 with gear clutch teeth which interlock with the clutch teeth 387 of the gear clutch assembly, the latter including the hub 388, the plate connections 389 and the clutch fork 390. A snap ring 391 is interposed between the carrier structure 383 and the clutch disc 389 to align these associated parts. This snap ring seats in an annular groove formed intermediate and annularly of the clutch teeth 387. The integral dual sprocket driven gears 392 are formed on the drum-like structure 393 and in assembly are aligned with the sprockets 304 of the drive assembly heretofore described, to permit arrangement of the sprocket belt S. The drum 393 of the driven sprocket assembly is supported at one end by the hub 394 which is an integral part of the drum and is connected thereto by the annular web 395, the latter being provided with a plurality of openings 396 as shown. The hub 394 is mounted on the intermediate bearing portion 396 of the shaft 366 and has associated therewith the plain bearing element 397 interposed between the shaft bearing and the hub. The hub structure 394 is formed with an annular seat 398 having at one end the shoulder 399 for receiving the inner race 400 of the bearing assembly 364. A snap ring 401 is provided in the hub structure 394 to prevent shifting of the inner race 400 away from the shoulder 399. The opposite end of the sprocket drum 393 carries the hub 402, the latter being spaced from the hub 388, the connecting flange 403, and peripheral flange 404. The peripheral flange 404 seats in an annular recess 405 formed in the inner face of the drum 393 and is clamped in position by snap ring 406. The outer face of the hub 402 is machined to provide a raceway for the reception of the rollers 407 of a roller assembly which includes the cage elements 408 and the outer raceway 409. The outer raceway 409 is fixed in an annular recess 410 formed in the end plate supporting structure heretofore described. A pin 411 projects from the inner face of the drum 393 into a slot 412 to prevent rotational movement of the hub structure 402.

The clutch actuating mechanism for the sprocket type of transfer mechanism illustrated in Figures 12 and 13 is best illustrated in the detail shown at Figure 9. In this Figure 9 the shifter shaft 470 is shown supporting the fork 471 which straddles the grooved clutch ring 472 to shift the clutch hub 388 as heretofore described. A spring pressed ball lock 373 is provided for locking the shifter bar 470 into adjusted position. An operating cam 474 functions through the clutch lever 104 to shift the operating pin 475 to operate the clutch mechanism in the usual manner. For sealing the clutch operating mechanism an O-ring 476 is arranged in a groove in the operating shaft 477, while a gasket 478 and a spring plug 479 operate as sealing means for the cap 480 and at the drilled opening 481 which latter accommodates the shifting pin 470.

The details of the clutch mechanism do not form a part of the present invention, it being obvious that changes can be made in these structures and still bring about proper operation of the parts.

In all forms of the present invention it will be noted that a lubricant chamber is provided within one of the output shafts, preferably at the end of the associated concentric output shaft. From this chamber ports are provided for distributing the lubricant to the bearing surfaces of the transfer mechanism. A lubricant pump furnishes lubricant to the lubricant chamber in the output shaft, the pump being normally submerged in the oil sump in the bottom of the transfer casing. The sprocket chains in one modification of the invention and the gearing in the other form of the invention are primarily lubricated through a splash system while the bearings are directly lubricated by the force feed system including the lubricant chamber and the pump.

What I claim is:

1. In a transfer mechanism for use in a motor vehicle assembly having a source of power and a pair of driven parallel axles, said transfer mechanism including a gear driven from the source of power and a pair of axially aligned output shafts, one of said shafts being formed with an axial bore, and the other shaft having a bearing portion arranged within said bore, each of said output shafts being adapted to supply torque to one of said axles, a gear mounted for free rotation on one of said output shafts and being powered by the gear on the input shaft, said freely rotating gear including a hub portion and a web, a planetary assembly for transmitting power to the other output shaft, said planetary assembly including a sun gear rotatable with the first output shaft, and a ring gear fixed to the second output shaft, a planet assembly for said planetary arranged between the sun gear and ring gear, the planets of said planet assembly being mounted on pins supported from the web of the freely mounted gear on the first output shaft, a lock ring mounted on the hub of said last-named gear and engaging said pins to prevent rotation of same, and means for locking the first freely mounted gear to its shaft.

2. In a transfer mechanism for use in a motor vehicle assembly having a source of power and a pair of driven parallel axles, said transfer mechanism including a gear driven from said source of power and a pair of axially aligned output shafts, one of said shafts being formed with an axial bore and the other shaft having spaced reduced bearing portions arranged within said bore, each of said output shafts being adapted to supply torque to one of the said axles, a gear mounted for free rotation on one of said output shafts and being powered by the gear on the input shaft, said gear including a hub portion and a web portion, a filler ring on said hub, a planetary assembly for transmitting power from one output shaft to the other, including a sun gear, ring gear and planet assembly, said sun gear being rotatable with the first output shaft, said ring gear including a hub extension concentrically splined about said output shaft portion formed with the axial bore, an outer bearing on said splined hub arranged intermediate the spaced reduced bearings, a planet assembly associated with said sun gear and ring gear for completing the planetary assembly, a series of pins carried by and extending through the web of said freely mounted gear, said pins extending laterally of each side of said web, the pin at one side of said web forming bearings for said planet pinions and at the other side of said web having flattened portions engaging said filler ring to prevent rotation of said pin, and a cage for said planet unit carried by said web and having an end bearing portion mounted on the second output shaft.

CARL EINAR SCHOU.

REFERENCES CITED

The following references are of record in the file of this patent:

UNITED STATES PATENTS

| Number | Name | Date |
| --- | --- | --- |
| 1,916,501 | Tenney | July 4, 1933 |
| 1,950,971 | Chilton | Mar. 13, 1934 |
| 2,080,477 | Higgins | May 18, 1937 |
| 2,108,366 | Cassagne | Feb. 15, 1938 |
| 2,290,319 | Dodge | July 21, 1942 |
| 2,343,291 | Gilfillan | Mar. 7, 1944 |
| 2,346,365 | Duffield | Apr. 11, 1944 |
| 2,383,873 | McPherson | Aug. 28, 1945 |
| 2,518,734 | Wemp | Aug. 15, 1950 |